(12) United States Patent
Mizusaki et al.

(10) Patent No.: US 11,002,596 B2
(45) Date of Patent: May 11, 2021

(54) PHOTOELECTRIC SENSOR AND MANUFACTURING METHOD THEREOF

(71) Applicant: OMRON Corporation, Kyoto (JP)

(72) Inventors: Hiroyuki Mizusaki, Kyoto (JP); Jumpei Nakamura, Kyoto (JP); Tomohiro Tsuji, Kyoto (JP); Tsuyoshi Miyata, Kyoto (JP); Makoto Sugimoto, Kyoto (JP)

(73) Assignee: OMRON Corporation, Kyoto (JP)

(*) Notice: Subject to any disclaimer, the term of this patent is extended or adjusted under 35 U.S.C. 154(b) by 129 days.

(21) Appl. No.: 16/275,329

(22) Filed: Feb. 14, 2019

(65) Prior Publication Data

US 2019/0285465 A1    Sep. 19, 2019

(30) Foreign Application Priority Data

Mar. 15, 2018  (JP) .............................. JP2018-048028

(51) Int. Cl.
  *G01J 1/42*   (2006.01)
  *G01J 1/04*   (2006.01)
  *G01J 1/02*   (2006.01)
  *G01V 8/12*   (2006.01)

(52) U.S. Cl.
  CPC ............... *G01J 1/0271* (2013.01); *G01J 1/04* (2013.01); *G01J 1/0403* (2013.01); *G01J 1/42* (2013.01); *G01V 8/12* (2013.01)

(58) Field of Classification Search
  CPC ..................... H01L 25/167; H01L 31/0203
  See application file for complete search history.

(56) References Cited

U.S. PATENT DOCUMENTS

| 5,767,508 A | * | 6/1998 | Masui | ................... G01J 1/42 |
| | | | | 250/227.11 |
| 9,028,122 B2 | | 5/2015 | Tuchrelo et al. | |
| 2006/0243990 A1 | * | 11/2006 | Suzuki | ................. H01L 25/167 |
| | | | | 257/81 |
| 2008/0210952 A1 | * | 9/2008 | Wada | ................. H01L 31/0203 |
| | | | | 257/82 |

(Continued)

FOREIGN PATENT DOCUMENTS

| CN | 203869700 | 10/2014 |
| CN | 203870274 | 10/2014 |
| DE | 202014009924 | 1/2015 |

(Continued)

OTHER PUBLICATIONS

"Search Report of Europe Counterpart Application", dated Aug. 21, 2019, pp. 1-7.

(Continued)

*Primary Examiner* — Thanh Luu
(74) *Attorney, Agent, or Firm* — JCIPRNET (57) ABSTRACT

Provided is a photoelectric sensor that enables manufacturing of a sensor with high environmental durability in a case in which there is more variation in case bodies. A photoelectric sensor includes: a package that includes an optical unit and a sealing member that seals the optical unit, and the optical unit includes at least any one of a light projecting portion that emits light and a light receiving portion that detects light; and a case body that accommodates the package, and a gap is provided between the package and the case body.

13 Claims, 5 Drawing Sheets

(56) References Cited

U.S. PATENT DOCUMENTS

2014/0170903 A1* 6/2014 Tuchrelo .............. H01R 13/665
                                                    439/620.21
2017/0160427 A1* 6/2017 Costello ................... G01V 8/12

FOREIGN PATENT DOCUMENTS

| | | |
|---|---|---|
| JP | H0310449 | 1/1991 |
| JP | H0581642 | 11/1993 |
| JP | H05342961 | 12/1993 |
| JP | 2007073417 | 3/2007 |
| JP | 2014107698 | 6/2014 |
| JP | 2015158999 | 9/2015 |
| JP | 2017027811 | 2/2017 |

OTHER PUBLICATIONS

"Office Action of Japan Counterpart Application," with English translation thereof, dated Nov. 20, 2020, p. 1-p. 8.

"Office Action of China Counterpart Application", dated Dec. 2, 2020, with English translation thereof, pp. 1-16.

* cited by examiner

PHOTOELECTRIC SENSOR AND MANUFACTURING METHOD THEREOF

CROSS-REFERENCE TO RELATED APPLICATION

This application claims the priority of Japan patent application serial no. 2018-048028, filed on Mar. 15, 2018. The entirety of the above-mentioned patent application is hereby incorporated by reference herein and made a part of this specification.

BACKGROUND

Technical Field

The disclosure relates to a photoelectric sensor and a manufacturing method thereof.

Description of Related Art

In the related art, a photoelectric sensor is used in order to detect the presence of an object in a detection region (for example, Patent Document 1 and the like). As a photoelectric sensor, a transmission-type sensor configured to accommodate a light projecting portion that emits light and a light receiving portion that detects light in separate case bodies and in which light emitted from one photoelectric sensor is received using another photoelectric sensor exists. If an object is present between the light projecting portion and the light receiving portion, the light is blocked, and the amount of light received by the light receiving portion is thus reduced. The transmission-type sensor detects the presence of an object by analyzing the reduction amount. Note that as a photoelectric sensor, there is a reflection-type sensor, in which a light projecting portion and a light receiving portion are accommodated in an integrated case body, and which detects the presence or the like of an object by allowing light to be reflected by the object and analyzing the reflected light.

Some photoelectric sensors are placed outdoors or in plants where machine working is performed. In such an environment, there is a concern that moisture, dust, and the like may enter the photoelectric sensor, may adhere to inner parts such as the light projecting portion and the light receiving portion, and may cause malfunction of the photoelectric sensor. Therefore, there are cases in which the adhesion of moisture and the like to inner parts is prevented by sealing the inner parts with a sealing member such as resin. Such sealing of the inner parts may be performed by a method of accommodating the inner parts in a metal case body of the photoelectric sensor and then press-fitting the sealing member directly into the metal case body.

Specifically, in a case in which a photoelectric sensor that has a case body with a substantially rectangular parallelepiped shape is manufactured, inner parts such as an optical element are accommodated in a case body first in a state in which a member corresponding to any one surface of the case body is not provided. Then, a sealing mold with a plate shape that is formed in accordance with the shape of the case body is disposed on the surface where a member has not been provided. A hole is opened in the sealing mold, and sealing is performed by press-fitting the sealing member from the hole to the inside of the case body.

[Patent Document 1] Japanese Unexamined Patent Application Publication No. 2014-107698

The shapes of case bodies may differ depending on the type of photoelectric sensor. That is, in a case in which a plurality of types of photoelectric sensor are manufactured, it is necessary to prepare a plurality of sealing molds in accordance with the shapes of the case body in order to fill the case bodies with the sealing members. Therefore, manufacturing costs of the photoelectric sensors increase when there is more variation in the case bodies.

SUMMARY

A photoelectric sensor according to an aspect of the disclosure includes: a package that includes an optical unit and a sealing member that seals the optical unit, and the package includes at least any one of a light projecting portion that emits light and a light receiving portion that detects light; and a case body that accommodates the package, and a gap is provided between the package and the case body.

A manufacturing method of a photoelectric sensor according to another aspect of the disclosure includes: disposing an optical unit that includes at least any one of a light projecting portion that emits light and a light receiving portion that receives light in a mold, press-fitting a sealing member into the mold, thereby forming a package; and accommodating the package in a case body, and a gap is provided between the package and the case body.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DESCRIPTION OF THE EMBODIMENTS

The disclosure provides a photoelectric sensor that enables manufacturing of a sensor with high environmental durability at low cost even in a case in which there is more variation in case bodies.

A photoelectric sensor according to an aspect of the disclosure includes: a package that includes an optical unit and a sealing member that seals the optical unit, and the package includes at least any one of a light projecting portion that emits light and a light receiving portion that detects light; and a case body that accommodates the package, and a gap is provided between the package and the case body.

According to this aspect, the photoelectric sensor is manufactured by packaging the optical unit and the sealing member in advance and then accommodating the package in the case body. It is possible to use a single type of package for a plurality of types of case body by forming inner shapes of a variety of case bodies in accordance with a shape of specific packages. That is, it is possible to manufacture a photoelectric sensor with high environmental durability at low cost even in a case in which there is more variation in the case bodies, without any need to prepare different sealing molds for the respective types of case body.

In this aspect, the case body may be formed by assembling a first member together with a second member, and at least any one of the first member and the second member may have a guide portion that guides the package to an inside of the case body.

According to this aspect, the guide portion is provided on either the first member or the second member that forms the case body, and it is possible to easily accommodate the package in the case body along the guide portion when the photoelectric sensor is assembled.

In the aspect, the package and the case body may be partially bonded to each other.

According to this aspect, the package is secured to the case body. Therefore, it is possible to prevent positional deviation of the package relative to the case body.

In the aspect, the case body may have a first attachment portion to which a window that protects an indicator that displays an operation status of the optical unit is attached.

According to this aspect, the window is attached to the case body, and it is possible to protect the indicator from impact and contamination. Also, it becomes easy to position the window relative to the case body due to the first attachment portion being provided on the case body.

In the aspect, the case body may have a second attachment portion to which a protector that protects a cable that is connected to the optical unit is attached.

According to this aspect, the protector is attached to the case body, and it is possible to protect the cable from impact and contamination. Also, the protector prevents excessive folding of the cable and prevents damage to the cable. Further, it becomes easy to position the protector relative to the case body due to the second attachment portion being provided on the case body.

In the aspect, the case body may be formed of metal.

According to this aspect, since the inner parts of the photoelectric sensor are accommodated in a metal case body, it is possible to protect the inner parts from impact.

A manufacturing method of a photoelectric sensor according to another aspect of the disclosure includes: disposing an optical unit that includes at least any one of a light projecting portion that emits light and a light receiving portion that receives light in a mold, press-fitting a sealing member into the mold, thereby forming a package; and accommodating the package in a case body, and a gap is provided between the package and the case body.

According to this aspect, the photoelectric sensor is manufactured by packaging the optical unit and the sealing member in advance and then accommodating the package in the case body. It is possible to use a single type of package for a plurality of types of case body by manufacturing a package that can be accommodated in case bodies with a variety of shapes. That is, it is possible to manufacture a photoelectric sensor with high environmental durability at low cost even in a case in which there is more variation in the case bodies, without any need to prepare different sealing molds for the respective types of case body.

According to the disclosure, it is possible to provide a photoelectric sensor that can be manufactured at low cost even in a case in which there is more variation in case bodies.

Embodiments of the disclosure will be described with reference to the accompanying drawings. Note that components to which the same reference numerals have been assigned in the drawings have the same or similar configurations.

Figure 1:
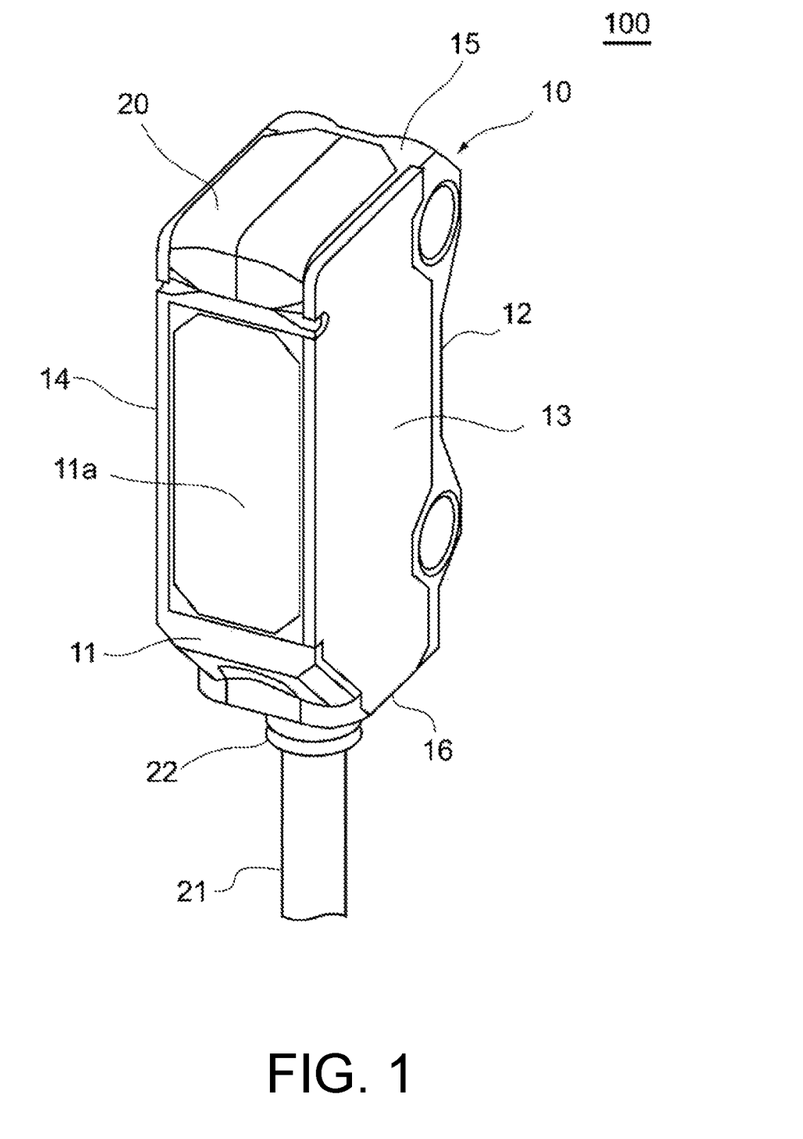
FIG. 1 is a perspective view of a photoelectric sensor according to an embodiment of the disclosure.

FIG. 1 is a perspective view of a photoelectric sensor 100 according to the disclosure. The photoelectric sensor uses light to detect the presence of an object in a detection region, a surface state of an object, and the like. There are a plurality of detection method using the photoelectric sensor. For example, two photoelectric sensors may be provided, one of the photoelectric sensors may be used as a light projector that emits light, and the other photoelectric sensor may be used as a light receiver that detects light. If an object is present between the light projector and the light receiver, the amount of light received by the light receiver decreases. The photoelectric sensors analyze the amount of reduced light and detect the presence and the like of an object. The photoelectric sensors used in this detection method are referred to as transmission-type photoelectric sensors.

Also, a method of using a photoelectric sensor in which a light projector and a light receiver are integrated to perform detection also exists as another detection method. This is a method of emitting light from the photoelectric sensor toward a reflection panel or a detection target and detecting the reflected light with the same photoelectric sensor. The photoelectric sensor detects the presence and the like of an object by analyzing the detected light. Such a photoelectric sensor that serves both as the light projector and as the light receiver is referred to as a reflection-type photoelectric sensor.

Figure 2:
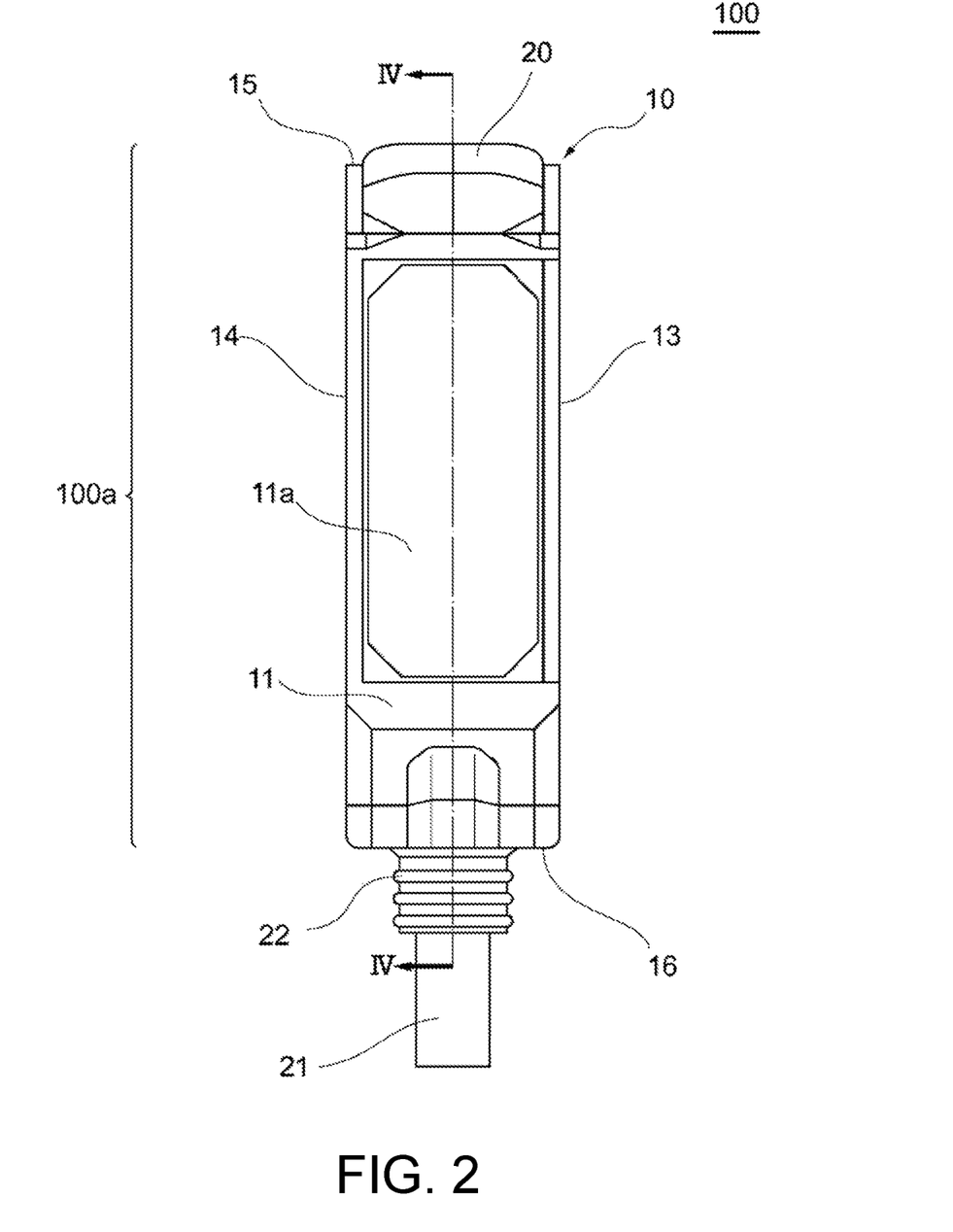
FIG. 2 is a view of the photoelectric sensor according to the embodiment of the disclosure when seen from a front surface.

Referring to FIGS. 1 and 2, a configuration of the photoelectric sensor 100 will be described. FIG. 1 is a perspective view of the photoelectric sensor 100 as described above. Also, FIG. 2 is a view of the photoelectric sensor 100 when seen from a front surface 11. Although a reflection-type photoelectric sensor 100 will be described as an example in the specification, the photoelectric sensor to which the disclosure is applied may be a transmission-type photoelectric sensor. The photoelectric sensor 100 includes a case body 10, a window 20, and a cable 21.

The case body 10 protects various parts such as a light projecting and receiving element included in the photoelectric sensor 100 from impact and contamination. The case body 10 is formed of metal, resin, or the like. The case body 10 has the front surface 11, a rear surface 12, a side surface 13, a side surface 14, a top surface 15, and a bottom surface 16. The front surface 11 is a frame that surrounds a light projecting and receiving surface 11a through which light is transmitted. The rear surface 12 is located at a position at which the rear surface 12 faces the front surface 11 with the inside of the case body 10 interposed therebetween. Also, the side surface 13 and the side surface 14 are located such that the side surface 13 and the side surface 14 face one another with the inside of the case body 10 interposed therebetween. Similarly, the top surface 15 and the bottom surface 16 are also located such that the top surface 15 and the bottom surface 16 face one another with the inside of the case body 10 interposed therebetween.

The front surface 11 surrounds the light projecting and receiving surface 11a through which light is transmitted. The photoelectric sensor 100 includes a light projecting portion that emits light, and the light emitted from the light projecting portion passes through the light projecting and receiving surface 11a and reaches a detection target. Also, the photoelectric sensor 100 includes a light receiving portion that detects light reflected by the detection target, and the light reflected by the detection target passes through the light projecting and receiving surface 11a and reaches the light receiving portion that is accommodated in the photoelectric sensor 100. The light projecting and receiving surface 11a may be formed of resin, glass, or the like, for example.

The window 20 protects an indicator (not illustrated) provided at an upper portion of the photoelectric sensor 100 from impact and contamination. The indicator displays an operation status of the photoelectric sensor 100. The operation status includes a power status, a detection status, and the like of the photoelectric sensor 100, for example. The indicator may be formed of a light emitting element such as a light emitting diode, for example. The indicator may be turned on in a case in which the power source of the photoelectric sensor 100 has been turned on or in a case in which the photoelectric sensor 100 has detected a workpiece. Also, the indicator may be turned on using light with different colors in accordance with types of workpieces that the photoelectric sensor 100 has detected.

The cable 21 is for sending electric power supplied from the power source to the photoelectric sensor 100 and accommodates a plurality of cords therein. Also, the cable 21 can connect the photoelectric sensor 100 to an amplifier unit that includes an amplifying unit, a control unit, and the like and deliver results of the detection performed by the photoelectric sensor 100. Although the cable 21 is connected to the bottom surface 16 of the photoelectric sensor 100 in the example, the connection position need not necessarily be the bottom surface 16 and there may be connection to the side surface 13, the side surface 14, the top surface 15, or the like. Note that at least any one of the power source and the amplifier unit may be incorporated in the photoelectric sensor 100.

As illustrated in FIG. 2, the photoelectric sensor 100 includes a protector 22. If the case body 10 and parts and the like included in the case body 10 are collectively referred to as a main body 100a, the protector 22 is provided at a connection part between the main body 100a and the cable 21. A load tends to be applied to a portion of the cable 21, which is connected to the main body 100a, due to folding of the cable 21. The protector 22 prevents excessive folding of the cable 21 and prevents damage to the cable 21.

Figure 3:
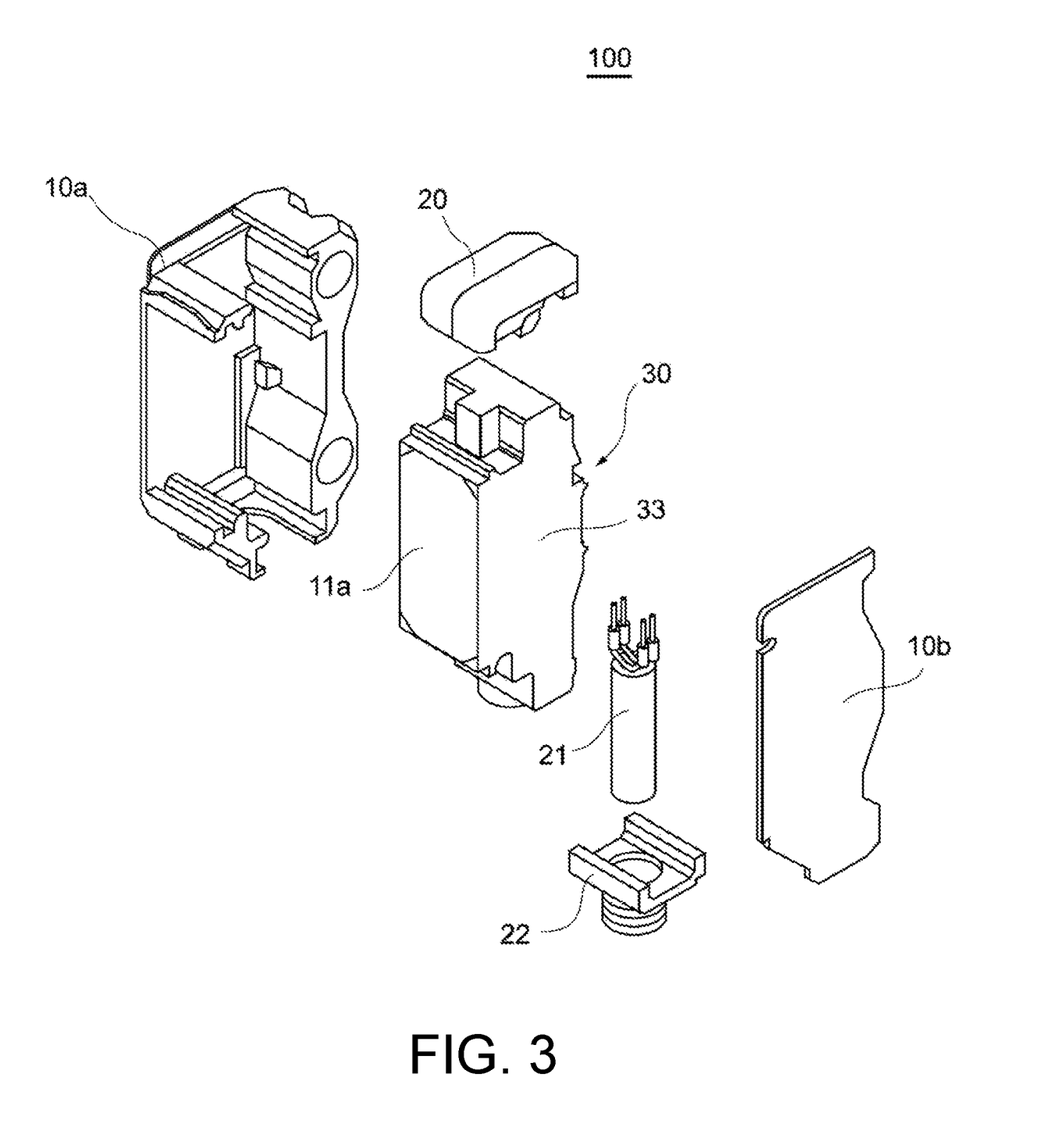
FIG. 3 is an exploded perspective view of the photoelectric sensor according to the embodiment of the disclosure.

FIG. 3 is an exploded perspective view of the photoelectric sensor according to the embodiment of the disclosure. The photoelectric sensor 100 includes a first member 10a, a second member 10b, the light projecting and receiving surface 11a, the window 20, the cable 21, the protector 22, and the package 30.

The first member 10a is assembled together with the second member 10b to form the case body 10. The first member 10a is a part of the case body 10 illustrated in FIG. 1, which corresponds to the front surface 11, the rear surface 12, the side surface 14, the top surface 15, and the bottom surface 16. The first member 10a is formed to be hollow inside such that the package 30 can be accommodated therein.

The second member 10b is assembled together with the first member 10a to form the case body 10. The second member 10b is a part of the case body 10 illustrated in FIG. 1, which corresponds to the side surface 13. It is possible to form the case body 10 with the package 30 accommodated therein by disposing the package 30 inside the first member 10a and then assembling the second member 10b with the first member 10a. The assembly of the first member 10a with the second member 10b may be performed through welding, utilization of an adhesive, or the like.

Although the case body 10 is formed of the first member 10a with a substantially rectangular parallelepiped shape and the second member 10b with a plate shape in the example, the shapes of the first member and the second member that form the case body 10 are not limited thereto. For example, the case body 10 may be formed of members obtained by partitioning into members on the right and left sides along the line IV-IV illustrated in FIG. 2.

The package 30 includes a sealing member 33 and an optical unit. The optical unit is located inside the sealing member 33. The package 30 is formed by disposing the optical unit in a sealing mold with a substantially rectangular parallelepiped shape and then filling the sealing mold with the sealing member 33. The sealing member 33 may be a hot melt, another resin, or the like, for example. Also, the light projecting and receiving surface 11a is attached on the front surface side of the package 30. The package 30 is accommodated in the first member 10a and the second member 10b.

Figure 4:
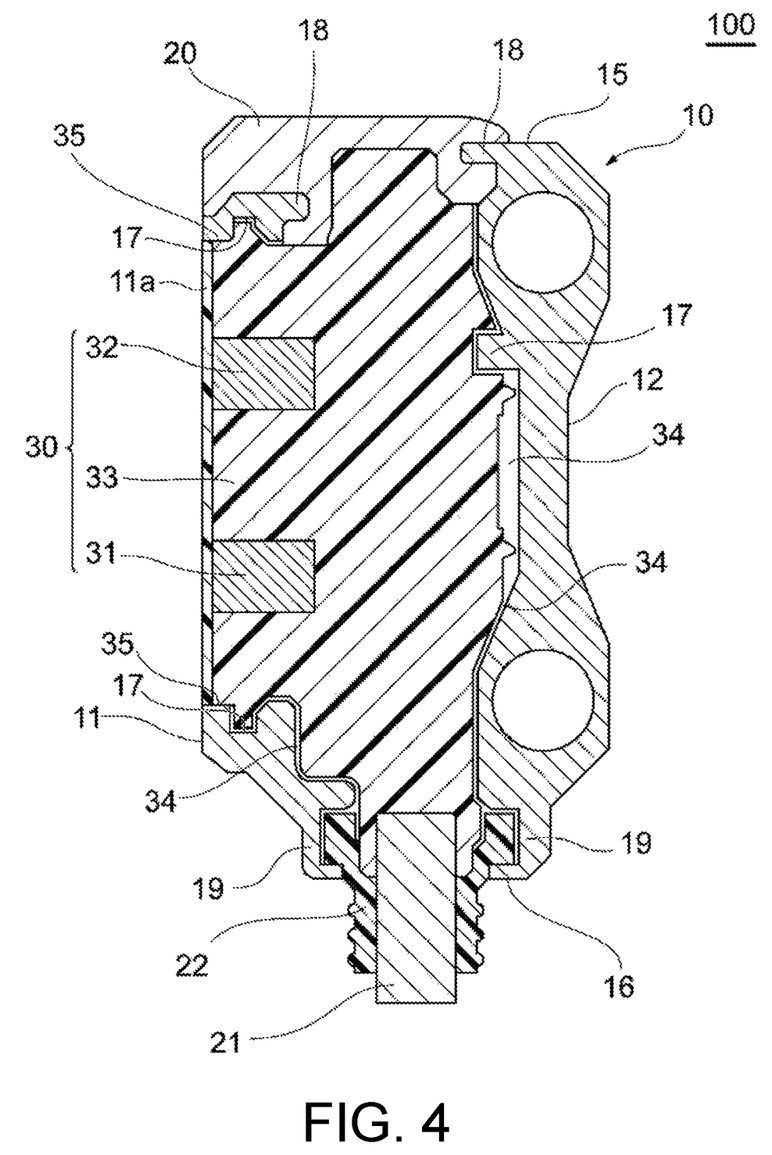
FIG. 4 is a sectional view taken along the line IV-IV in FIG. 2.

FIG. 4 is a sectional view of the photoelectric sensor 100 taken along the line IV-IV in FIG. 2. Referring to FIG. 4, an inner configuration of the photoelectric sensor 100 will be described.

As illustrated in FIG. 4, the package 30 is accommodated in the case body 10, the window 20 is attached to the upper portion of the case body 10, and the cable 21 and the protector 22 are attached to the lower portion of the case body 10.

The package 30 has the optical unit and the sealing member 33. The optical unit is formed of a light projecting portion 31 and a light receiving portion 32 and is located inside the sealing member 33.

The light projecting portion 31 is a part that emits light to the detection target. The light projecting portion 31 includes a light projecting element and a light projecting lens. The light projecting element may be a laser diode (LD) or a light emitting diode (LED), for example. The light projecting lens is located on the side of the light projecting and receiving surface 11a beyond the light projecting element, and the light emitted from the light projecting element passes through the light projecting lens and reaches the detection target.

The light receiving portion 32 is a portion that detects light reflected from the detection target. The light receiving portion 32 includes a light receiving element and a light receiving lens. The light receiving element may be a photodiode or a position detecting element, for example. The light receiving lens is located on the side of the light projecting and receiving surface 11a beyond the light receiving element, and the light reflected from the detection target passes through the light receiving lens and reaches the light receiving element.

A gap is provided between the package 30 and the case body 10 in a state in which the package 30 is accommodated in the case body 10. The gap is a gap 34 for facilitating the accommodation of the package 30 in the case body 10. It is possible to accommodate the package 30 such that the package 30 is slid from the closest side of the sheet surface to the furthest side of the sheet surface in FIG. 4 along the inner surface of the case body 10, for example, by the gap 34 being provided. Note that the gap 34 may not be provided over the entire circumference of the package 30. For example, the package 30 and the case body 10 may be bonded to each other at the bonding portion 35 as in the example. In this manner, the package 30 is secured to the case body 10 by a part of the package 30 being bonded to the case body 10. Therefore, it is possible to prevent positional deviation of the package 30 relative to the case body 10. The bonding between the package 30 and the case body 10 may be performed using an adhesive, for example. Also, resin, an adhesive, or the like may be poured into the gap 34 after the package 30 is accommodated in the case body 10. Sealing properties are improved, and environmental durability of the photoelectric sensor 100 can further be enhanced by pouring the resin, the adhesive, or the like into the gap 34.

The case body 10 has a guide portion 17 provided therein. The guide portion 17 is for guiding the package 30 to the inside of the case body 10 and has an uneven shape in accordance with the shape of the package 30. It is possible to easily accommodate the package 30 in the case body 10 along the guide portion 17 by the guide portion 17 being provided.

The case body 10 has a first attachment portion 18 and a second attachment portion 19. The first attachment portion 18 is a portion to which the window 20 is attached. A lower portion of the window 20 in the embodiment is formed into an L shape in a sectional view. In addition, the first attachment portion 18 has an uneven shape in accordance with the L-shaped portion of the window 20. The window 20 is attached to the case body 10 by the L-shaped portion of the window 20 being fitted into the first attachment portion 18. Specifically, the window 20 is attached by sliding the window 20 from the closest side of the sheet surface to the furthest side of the sheet surface in FIG. 4 while causing the L-shaped portion of the window 20 to move along the inner surface of the first attachment portion 18 similarly to the case in which the package 30 is accommodated in the case body 10. Further, the upper portion of the protector 22 in the embodiment is formed to project in the left and right directions in FIG. 4 in the sectional view (the directions from the center toward the front surface 11 and toward the rear surface 12). The second attachment portion 19 is a recessed portion that is formed in accordance with the shape of the upper portion of the protector 22. The protector 22 is attached to the case body 10 by the upper portion of the protector 22 being fitted into the second attachment portion 19. Specifically, the protector 22 is attached by sliding the protector 22 from the closest side of the sheet surface to the furthest side of the sheet surface in FIG. 4 while causing the upper portion of the protector 22 to move along the second attachment portion 19 similarly to the case in which the package 30 is accommodated in the case body 10.

It is possible to attach the window 20 to the case body 10 and to protect the indicator in the window 20 from impact and contamination by the case body 10 having the first attachment portion 18. In addition, it becomes easy to position the window 20 relative to the case body 10 when assembly is performed.

In addition, it is possible to attach the protector 22 to the case body 10 and to protect the cable 21 from impact and contamination by the case body 10 having the second attachment portion 19. Also, it is possible to prevent excessive folding of the cable 21 and to prevent damage to the cable 21. Further, it becomes easy to position the protector 22 relative to the case body 10 when assembly is performed.

Figure 5:
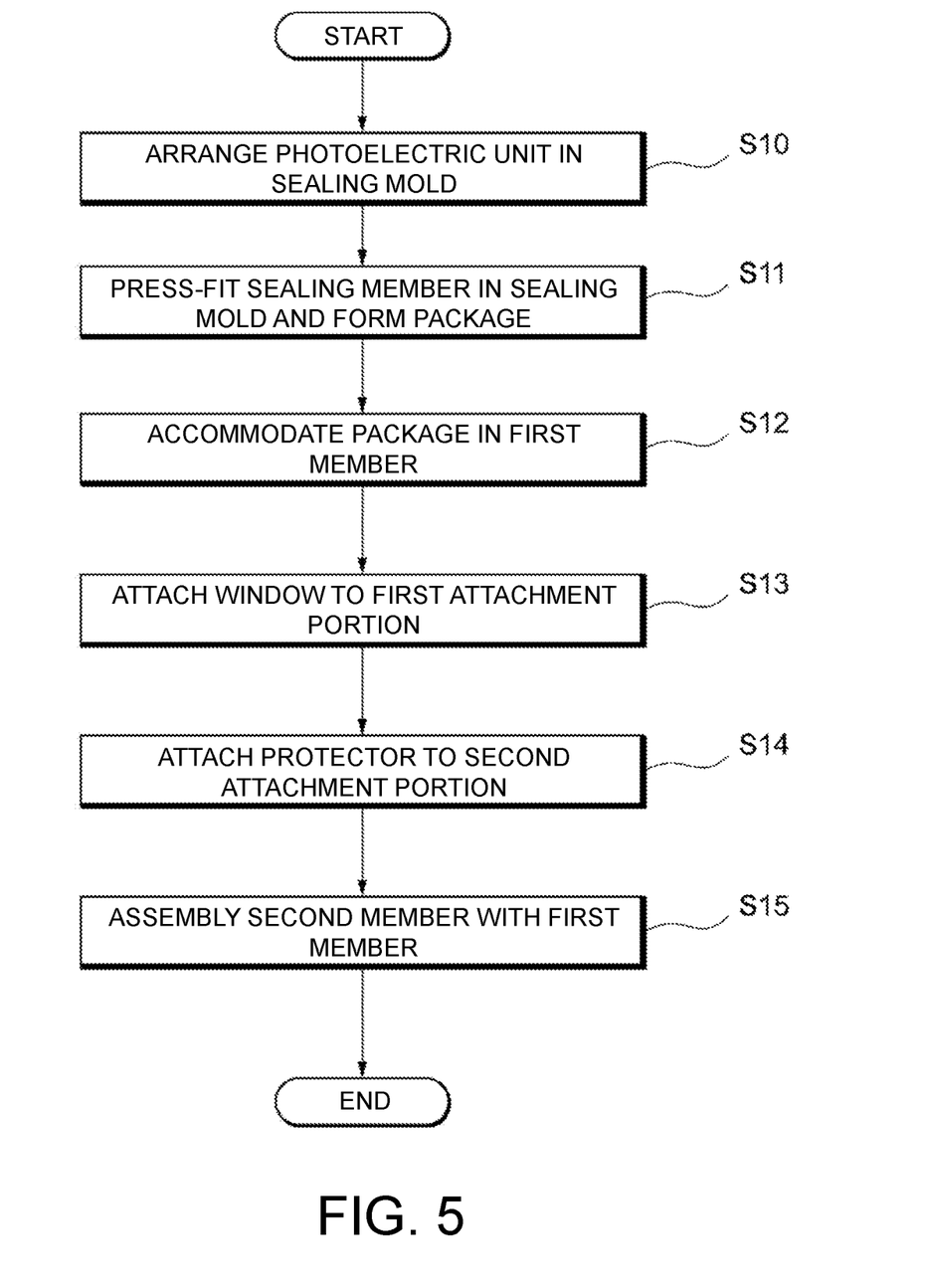
FIG. 5 is a flowchart illustrating a manufacturing process of the photoelectric sensor according to the embodiment of the disclosure.

FIG. 5 is a flowchart illustrating a manufacturing method of the photoelectric sensor 100. First, the optical unit (the light projecting portion 31 and the light receiving portion 32) is disposed in the sealing mold (S10). Then, the sealing member 33 is press-fitted into the sealing mold, thereby forming the package (S11). The press-fitted sealing member 33 may be resin such as a hot melt at a high temperature, for example. After the cooling, the light projecting and receiving surface 11a is attached to the front surface side of the formed package 30.

Next, the package 30 is accommodated in the first member 10a (S12). At this time, the package 30 may be accommodated such that the side surface thereof is moved along the guide portion 17 of the first member 10a as illustrated in FIG. 4. The gap 34 as illustrated in FIG. 4 is provided between the accommodated package 30 and the first member 10a. It is possible to easily accommodate the package 30 such that the package 30 is moved along the inner surface of the case body 10 by the gap 34 being provided. The upper portion, the lower portion, and one side surface of the package 30 are exposed to the outside in a state in which the package 30 is accommodated in the first member 10a.

Next, the window 20 is attached to the first attachment portion 18 (S13). The window 20 may be attached to the case body 10 by assembling the lower portion of the window 20 with the first attachment portion 18 that is formed at the upper portion of the case body 10 and has an uneven shape as illustrated in FIG. 4, for example. Further, the protector 22 is attached to the second attachment portion 19 (S14). The protector 22 may be attached to the case body 10 by assembling the upper portion of the protector 22 with the second attachment portion 19 that is formed at the lower portion of the case body 10 and has an uneven shape similarly to the attachment of the window 20 to the case body 10.

Finally, the second member 10b is assembled together with the first member 10a (S15). The assembly of the first member 10a with the second member 10b may be performed through welding, utilization of an adhesive, or the like. The manufacturing process of the photoelectric sensor 100 has been described above.

The photoelectric sensor 100 according to the embodiment is manufactured by packaging the optical unit and the sealing member 33 in advance and then accommodating the package 30 in the case body 10. It is possible to use a single type of package 30 for a plurality of types of case body by forming the inner shapes of a variety of types of case body 10 in accordance with the shape of the specific package 30. That is, it is possible to manufacture the photoelectric sensor 100 at low cost even in a case in which there is more variation in the case bodies 10 with no need to prepare different sealing molds for the respective types of the case bodies 10.

In addition, if sealing is performed by a method of press-fitting the sealing member 33 directly into the case body 10, the entire inside of the case body 10 is filled with the sealing member 33, and no gap is generated between the case body 10 and the sealing member 33. Therefore, there is a concern that the sealing member 33 expands and the photoelectric sensor 100 is damaged in a case in which the photoelectric sensor 100 is used in a high-temperature environment. However, according to the photoelectric sensor 100 of the embodiment, it is possible to prevent damage to the photoelectric sensor 100 due to thermal expansion of the sealing member 33 since the gap is provided between the sealing member 33 and the case body 10.

(Supplementary Note)

Provided is a photoelectric sensor including: the package 30 that includes the optical unit including at least any one of the light projecting portion 31 that emits light and the light receiving portion 32 that detects light and the sealing member 33 that seals the optical unit; and the case body 10 that accommodates the package 30, and the gap 34 is provided between the package 30 and the case body 10.

The aforementioned embodiments are for facilitating understanding of the disclosure and are not intended to limit interpretation of the disclosure. The elements and the arrangement, the materials, the conditions, the shapes, the sizes, and the like thereof in the embodiments are not limited to those described as examples and can be appropriately changed. Also, configurations described in different embodiments can be partially replaced or combined.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A photoelectric sensor comprising:
   a package that includes an optical unit and a sealing member that seals the optical unit, and the optical unit includes at least any one of a light projecting portion that emits light and a light receiving portion that detects light; and
   a case body that accommodates the package, wherein the case body has a first attachment portion to which a window that protects an indicator that displays an operation status of the optical unit is attached,
   wherein a gap is provided between the package and the case body.

2. The photoelectric sensor according to claim 1,
   wherein the case body is formed by assembling a first member with a second member, and
   at least any one of the first member and the second member has a guide portion that guides the package to an inside of the case body.

3. The photoelectric sensor according to claim 2, wherein the package and the case body are partially bonded to each other.

4. The photoelectric sensor according to claim 3, wherein the case body has a second attachment portion to which a protector that protects a cable that is connected to the optical unit is attached.

5. The photoelectric sensor according to claim 2, wherein the case body has a second attachment portion to which a protector that protects a cable that is connected to the optical unit is attached.

6. The photoelectric sensor according to claim 2, wherein the case body is formed of metal.

7. The photoelectric sensor according to claim 1, wherein the package and the case body are partially bonded to each other.

8. The photoelectric sensor according to claim 7, wherein the case body has a second attachment portion to which a protector that protects a cable that is connected to the optical unit is attached.

9. The photoelectric sensor according to claim 7, wherein the case body is formed of metal.

10. The photoelectric sensor according to claim 1, wherein the case body has a second attachment portion to which a protector that protects a cable that is connected to the optical unit is attached.

11. The photoelectric sensor according to claim 10, wherein the case body is formed of metal.

12. The photoelectric sensor according to claim 1, wherein the case body is formed of metal.

13. A manufacturing method of a photoelectric sensor comprising:
    disposing an optical unit that includes at least any one of a light projecting portion that emits light and a light receiving portion that receives light in a mold;
    press-fitting a sealing member into the mold, thereby forming a package;
    providing a case body comprising a first member and a first attachment portion;
    accommodating the package in the case body, wherein a gap is provided between the package and the case body;
    attaching a window to the first attachment portion; and
    assembling a second member with the first member.

* * * * *